United States Patent
Yamada et al.

(10) Patent No.: US 10,975,503 B2
(45) Date of Patent: *Apr. 13, 2021

(54) SKIN MATERIAL FOR VEHICLE INTERIOR

(71) Applicants: TOYOTA BOSHOKU KABUSHIKI KAISHA, Aichi-ken (JP); DAIKI CO., LTD., Fukui-ken (JP)

(72) Inventors: Takamasa Yamada, Aichi-ken (JP); Hirohiko Sakai, Kyoto-fu (JP); Takayoshi Yamamoto, Fukui-ken (JP)

(73) Assignees: TOYOTA BOSHOKU KABUSHIKI KAISHA, Aichi-Ken (JP); DAIKI CO., LTD., Fukui-Ken (JP)

(*) Notice: Subject to any disclaimer, the term of this patent is extended or adjusted under 35 U.S.C. 154(b) by 363 days.

This patent is subject to a terminal disclaimer.

(21) Appl. No.: 15/976,268

(22) Filed: May 10, 2018

(65) Prior Publication Data

US 2018/0340272 A1    Nov. 29, 2018

(30) Foreign Application Priority Data

May 26, 2017    (JP) ............................... JP2017-104693

(51) Int. Cl.
*D03D 1/00*    (2006.01)
*D03D 15/00*   (2021.01)
(Continued)

(52) U.S. Cl.
CPC .................. *D03D 1/00* (2013.01); *B60Q 3/62* (2017.02); *B60Q 3/64* (2017.02); *D02G 3/446* (2013.01);
(Continued)

(58) Field of Classification Search
CPC ...... D03D 1/00; D03D 15/00; D03D 15/0038; D03D 2700/0174; D03D 2700/0137;
(Continued)

(56) References Cited

U.S. PATENT DOCUMENTS 3,508,589 A    4/1970   Burton et al.
3,615,313 A *  10/1971  Phaneuf .................... G02B 6/06
                                                    65/410
(Continued)

FOREIGN PATENT DOCUMENTS

DE    3525838        1/1987
EP    2267204 A1 *  12/2010   ......... D03D 15/0094

OTHER PUBLICATIONS

English translation to EP 2267204 A1 to Pintz obtained from European Patent Office website. (Year: 2010).*

(Continued)

*Primary Examiner* — Jeremy R Pierce
(74) *Attorney, Agent, or Firm* — Greenblum & Bernstein, P.L.C.

(57) ABSTRACT

A skin material for vehicle interior is bonded to a resinous vehicle interior base. The skin material for vehicle interior includes a woven fabric woven by using synthetic resin fibers, side emission type optical fibers, and heat fusible fibers as warps or wefts. The synthetic resin fibers and the side emission type optical fibers adjacent to the synthetic resin fibers are bonded in respective longitudinal directions thereof by the heat fusible fibers. Even when a plurality of the side emission type optical fibers are woven between the adjacent synthetic resin fibers, the adjacent side emission type optical fibers may be bonded to each other in the longitudinal direction by the heat fusible fibers. The heat fusible fibers may be obtained by twisting multifilaments and heat fusion yarns having a melting point lower than that of the multifilaments, and the multifilaments remain as constituent yarns after the bonding.

6 Claims, 4 Drawing Sheets

(51) Int. Cl.
*F21V 8/00* (2006.01)
*B60Q 3/64* (2017.01)
*B60Q 3/62* (2017.01)
*D02G 3/44* (2006.01)

(52) U.S. Cl.
CPC ............ *D03D 15/00* (2013.01); *G02B 6/001* (2013.01); *G02B 6/0005* (2013.01); *D03D 2700/0137* (2013.01); *D03D 2700/0155* (2013.01); *D03D 2700/0174* (2013.01); *D10B 2401/04* (2013.01); *D10B 2401/041* (2013.01); *D10B 2401/20* (2013.01); *D10B 2505/12* (2013.01)

(58) Field of Classification Search
CPC ...... B60Q 3/62; G02B 6/001; D10B 2505/12; D10B 2401/04; D10B 2401/20; D02G 3/04
See application file for complete search history.

(56) References Cited

U.S. PATENT DOCUMENTS

| | | | | |
|---|---|---|---|---|
| 5,478,624 | A | * | 12/1995 | Lofquist ............... D02G 3/402 139/399 |
| 10,328,850 | B2 | * | 6/2019 | Yamada ................ D03D 15/00 |
| 2005/0252568 | A1 | * | 11/2005 | Huang .................. G02B 6/001 139/420 A |
| 2015/0177436 | A1 | * | 6/2015 | Zimmermann ......... D03D 1/00 362/510 |

OTHER PUBLICATIONS

U.S. Appl. No. 15/976,248 to Takamasa Yamada et al., filed May 10, 2018.

Official Communication issued in European Patent Office (EPO) Patent Application No. 18173571.3, dated Aug. 8, 2018.

* cited by examiner

[Fig. 1]
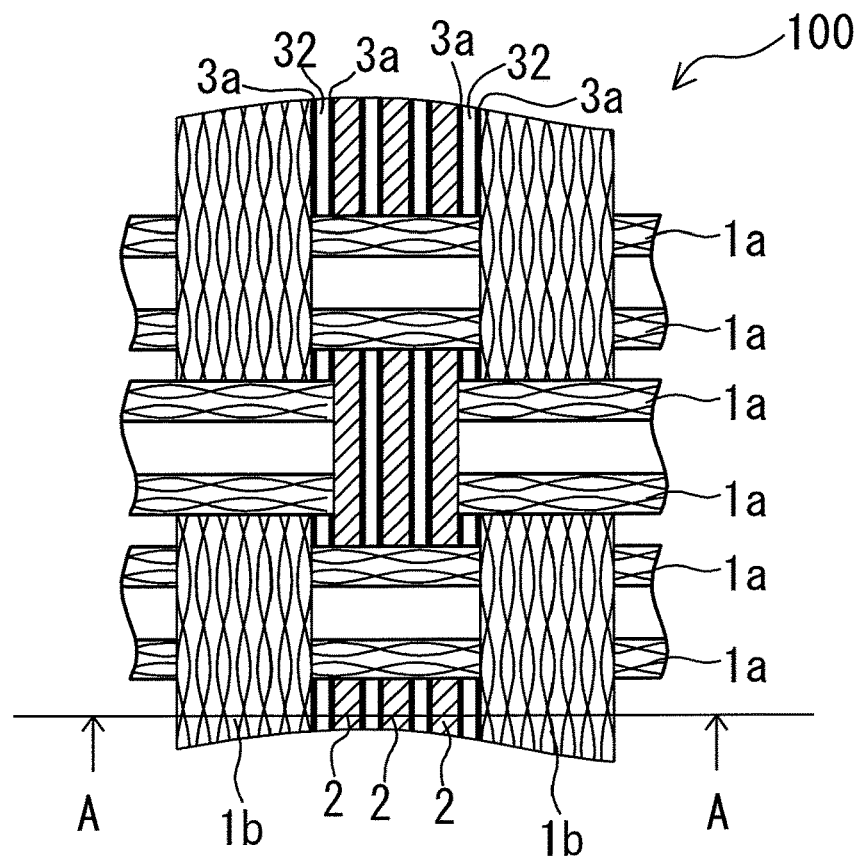
[Fig. 2]
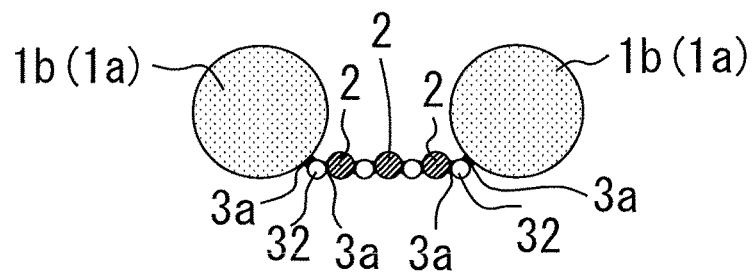
[Fig. 3]
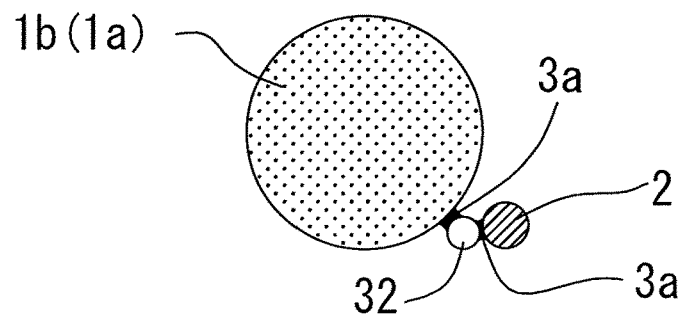

[Fig. 4]
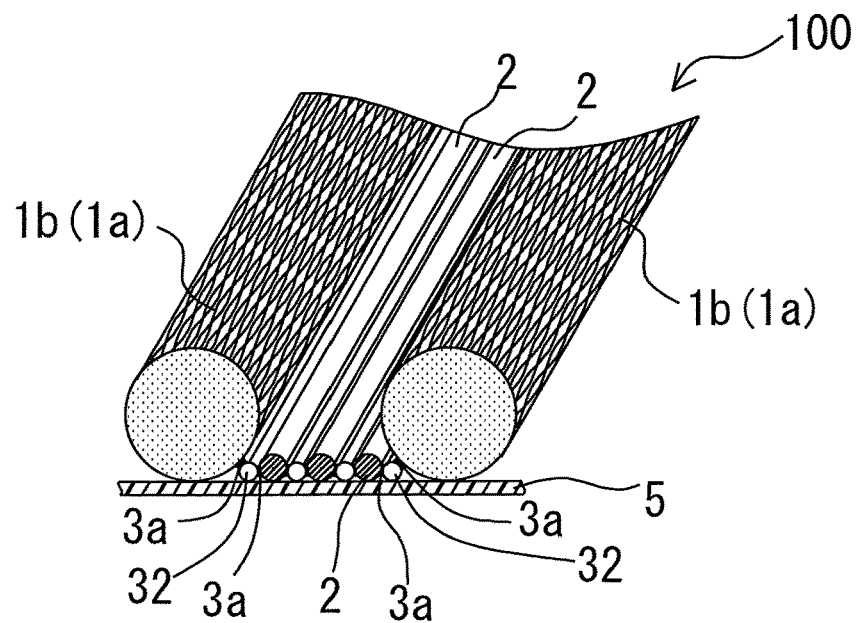
[Fig5]
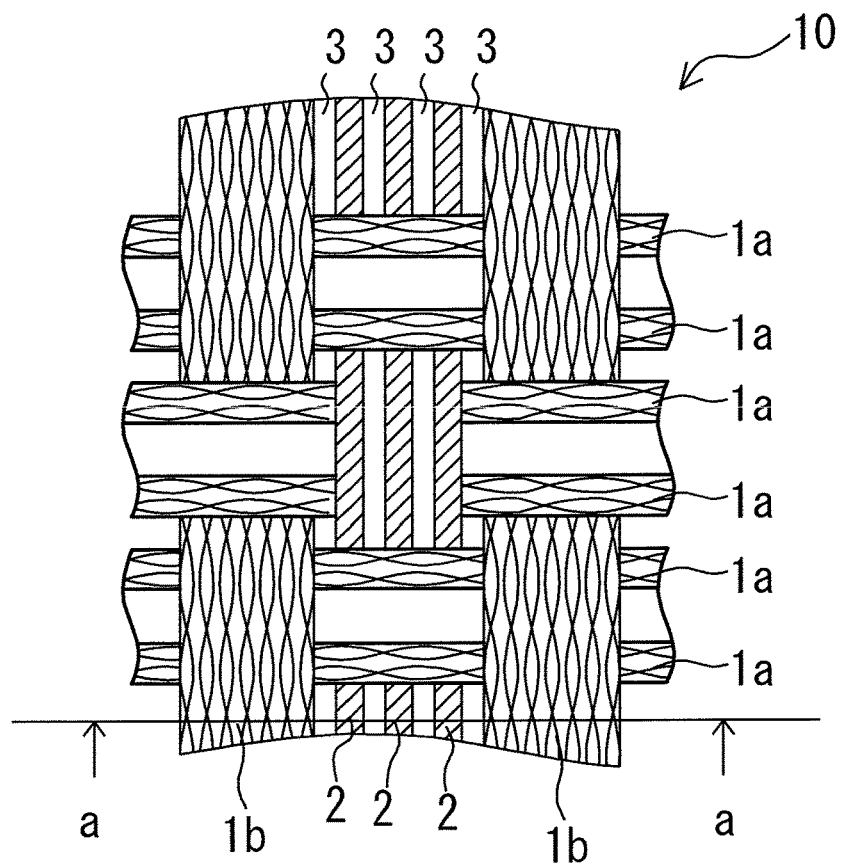

[Fig. 6]
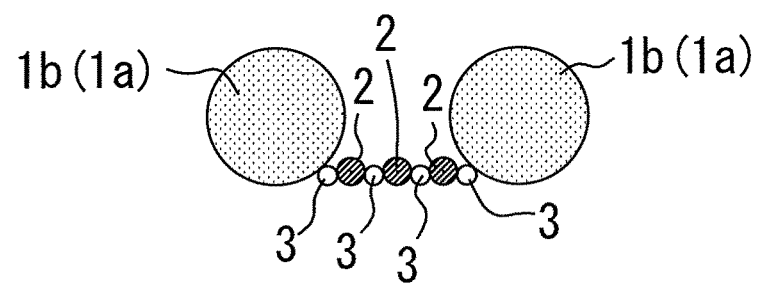
[Fig. 7]
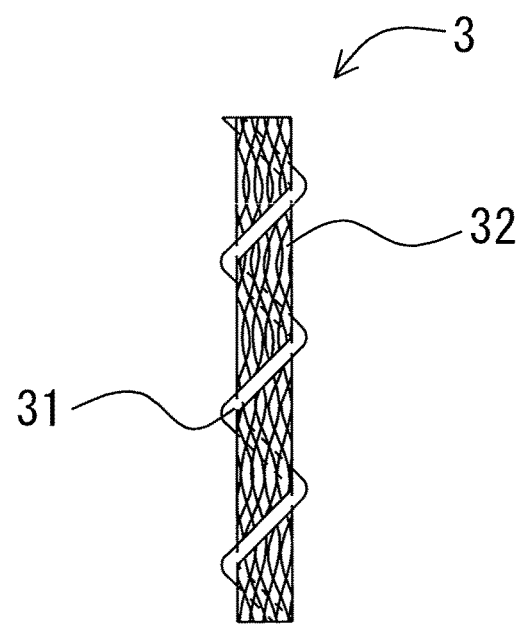

[Fig. 8]
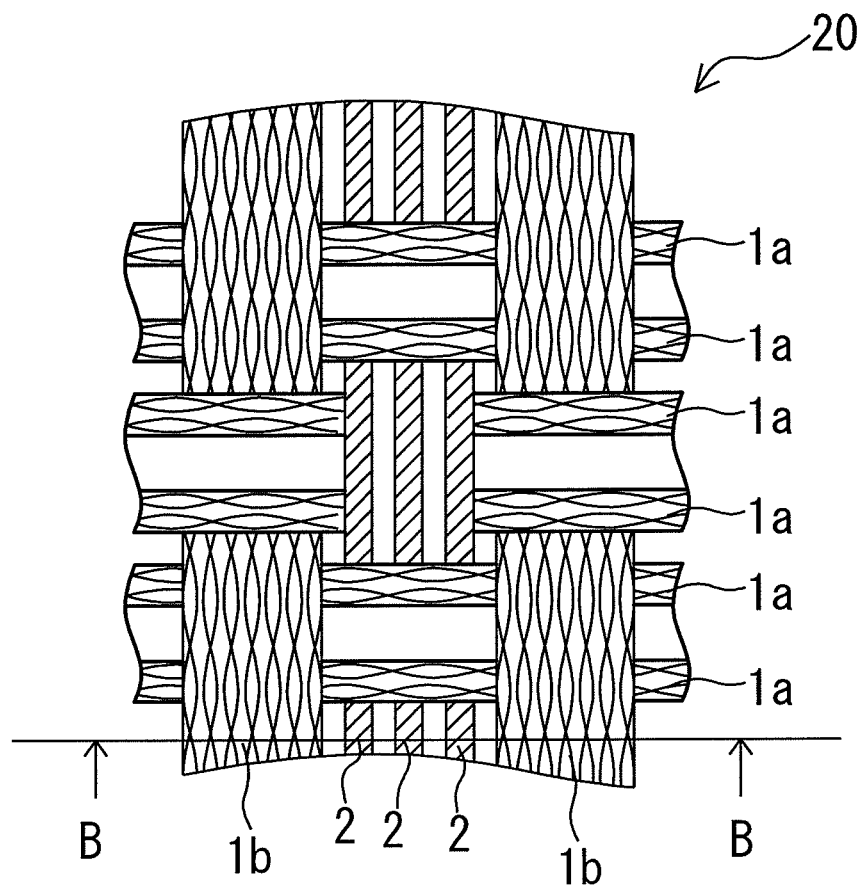
[Fig. 9]
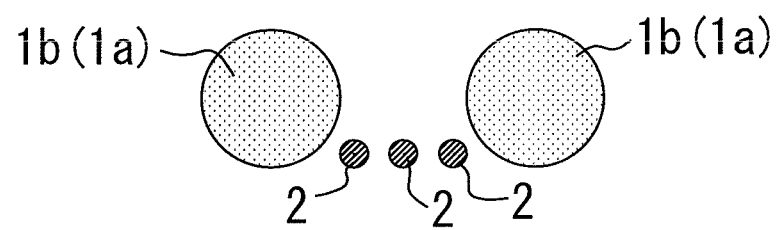

SKIN MATERIAL FOR VEHICLE INTERIOR

CROSS-REFERENCE TO RELATED APPLICATIONS

The present application claims priority under 35 U.S.C. § 119 of Japanese Application No. 2017-104693 filed on May 26, 2017, the disclosure of which is expressly incorporated by reference herein in its entirety.

BACKGROUND

1. Technical Field

The present invention relates to a skin material for vehicle interior. The skin material for vehicle interior includes a woven fabric woven by using synthetic resin fibers, side emission type optical fibers, and heat fusible fibers, and suppresses the fray of the side emission type optical fibers in an end edge part cut into a predetermined shape and size, wherein the synthetic resin fibers and the side emission type optical fibers adjacent to each other are bonded in longitudinal directions thereof.

2. Related Art

The use of optical fibers is expanding in technical fields of optical communication and the like along with popularization of the Internet and the like. Based on the feature of optical fibers which can guide light made incident from one end to the other end for light transmission, the optical fibers are used also in applications including, for example, various illuminations and displays.

For example, an optical fiber woven fabric is known (for example, see Japanese Unexamined Patent Application Publication No. 2016-37688). The optical fiber woven fabric is obtained by alternately disposing warps of a plurality of optical fibers and warps composed of ordinary yarns, and crossing and integrating wefts disposed on the front and back surfaces of the optical fibers, warps composed of ordinary yarns, or connecting warps disposed at predetermined intervals. In this optical fiber woven fabric, patterns are formed on the surface of the woven fabric in a region where the degree of exposure of the optical fibers on the surface of the woven fabric is low and a region where the degree of exposure of the optical fibers is high depending on how the surface of the optical fibers is covered with the warps and wefts composed of normal yarns. A clear emission pattern is expressed by the side light leakage of the optical fibers.

SUMMARY

In the optical fiber woven fabric described in Japanese Unexamined Patent Application Publication No. 2016-37688, a clear emission pattern is expressed by the side light leakage of the optical fibers depending on how the surface of the optical fibers is covered with the warps and wefts composed of ordinary yarns. However, Japanese Unexamined Patent Application Publication No. 2016-37688 does not mention at all that the fray of the optical fibers in a cut end edge part is suppressed when the optical fiber woven fabric is cut into a predetermined shape and size.

Conventionally, when a woven fabric woven using synthetic resin fibers and the like is cut into a predetermined shape and size, and the fibers are apt to be frayed in the cut end edge part, heat fusion yarns are woven, so that the fray is suppressed. Furthermore, in a woven fabric 20 obtained by weaving optical fibers which are monofilaments, have a substantially circular cross section, and are apt to slide (see FIG. 8 and FIG. 9 showing a B-B cross section in FIG. 8), the optical fibers are particularly apt to be frayed during cutting. In order to suppress the fray, it is conceivable to use heat fusible yarns.

As described above, it is conceivable to use the heat fusion yarns in order to suppress the fray of the optical fibers, but the heat fusion yarns are not used as they are. The heat fusion yarns are usually used as heat fusible fibers obtained twisting the heat fusion yarns and multifilaments and having high fineness. Therefore, for example, when optical fibers as wefts and heat fusible fibers as warps are woven, heat fusible fibers having high fineness must be woven at intervals, which causes the optical fibers and the heat fusible fibers to be brought into contact with each other in dot forms. As a result, the optical fibers cannot be sufficiently fixed, which may cause the optical fibers to be frayed during cutting.

The present invention has been made in view of the above-described circumstances of the prior art, and it is an object of the present invention to provide a skin material for vehicle interior which includes a woven fabric woven by using synthetic resin fibers, side emission type optical fibers, and heat fusible fibers, and suppress the fray of the side emission type optical fibers in an end edge part cut into predetermined shape and size, wherein the synthetic resin fibers and the side emission type optical fibers adjacent to each other are bonded in longitudinal directions thereof.

The present invention is as follows.

1. A skin material for vehicle interior bonded to a resinous vehicle interior base, the skin material for vehicle interior comprising a woven fabric woven by using synthetic resin fibers, side emission type optical fibers, and heat fusible fibers as warps or wefts, wherein the synthetic resin fibers and the side emission type optical fibers adjacent to the synthetic resin fibers are bonded in respective longitudinal directions by the heat fusible fibers.

2. The skin material for vehicle interior according to claim 1, wherein:

a plurality of the side emission type optical fibers are woven between the synthetic resin fibers adjacent to each other; and the side emission type optical fibers adjacent to each other are bonded to each other in the longitudinal direction by the heat fusible fibers.

3. The skin material for vehicle interior according to claim 1, wherein the heat fusible fibers are obtained by twisting multifilaments and heat fusion yarns having a melting point lower than that of the multifilaments.

4. The skin material for vehicle interior according to claim 2, wherein the heat fusible fibers are obtained by twisting multifilaments and heat fusion yarns having a melting point lower than that of the multifilaments.

5. The skin material for vehicle interior according to claim 3, wherein the multifilaments remain as constituent yarns after the bonding.

6. The skin material for vehicle interior according to claim 4, wherein the multifilaments remain as constituent yarns after the bonding.

The skin material for vehicle interior of the present invention includes the woven fabric woven by using synthetic resin fibers, side emission type optical fibers, and heat fusible fibers as warps or wefts, wherein the synthetic resin fibers and the side emission type optical fibers adjacent to the synthetic resin fibers are bonded in respective longitudinal directions thereof by the heat fusible fibers.

Thus, the synthetic resin fibers and the side emission type optical fibers adjacent thereto are bonded in the longitudinal direction by the heat fusible fibers, whereby the fray of the side emission type optical fibers which are monofilaments, have a substantially circular cross section, and are apt to slide can be sufficiently suppressed when the skin material for vehicle interior is cut into a predetermined shape and size. The side emission type optical fibers can be sufficiently fixed without using many heat fusible fibers, which are advantageous also from the viewpoint of costs.

When the plurality of side emission type optical fibers are woven between the adjacent synthetic resin fibers, and the adjacent side emission type optical fibers are bonded in the respective longitudinal directions thereof by the heat fusible fibers, the fray of the side emission type optical fibers can be sufficiently suppressed when the skin material for vehicle interior is cut although the plurality of side emission type optical fibers are continuously woven between the adjacent synthetic resin fibers.

Furthermore, when the heat fusible fibers are obtained by twisting multifilaments and heat fusion yarns having a melting point lower than that of the multifilaments, the heat fusible fibers have a sufficient strength as fibers to be woven during weaving, and the heat fusible fibers can be reliably and easily woven between the synthetic resin fibers and the side emission type optical fibers and between the adjacent side emission type optical fibers, whereby the fray of the side emission type optical fibers during cutting can be sufficiently suppressed.

When the multifilaments remain as constituent yarns after bonding, heat fusion yarns contained in the heat fusible fibers melt, which causes no decrease in the strength and the like of the skin material for vehicle interior even after the synthetic resin fibers and the side emission type optical fibers are bonded.

BRIEF DESCRIPTION OF DRAWINGS

FIG. 1 is a schematic plan view of a part of a skin material for vehicle interior according to the present invention.

FIG. 2 is a schematic cross-sectional view showing an A-A cross section of the skin material for vehicle interior in FIG. 1.

FIG. 3 is a schematic cross-sectional view showing an enlarged part in FIG. 2.

FIG. 4 is a schematic perspective view showing an aspect in which the skin material for vehicle interior in FIG. 1 is bonded to a vehicle interior base.

FIG. 5 is a schematic plan view of a woven fabric used for manufacturing a skin material for vehicle interior of the present invention.

FIG. 6 is a schematic cross-sectional view showing an a-a cross section of the woven fabric in FIG. 5.

FIG. 7 is a schematic front view of an example of heat fusible fibers.

FIG. 8 is a schematic plan view of a woven fabric used for manufacturing a conventional skin material for vehicle interior into which heat fusible fibers are not woven.

FIG. 9 is a schematic cross-sectional view showing a B-B cross section of the woven fabric in FIG. 8.

DETAILED DESCRIPTION

Hereinafter, the present invention will be described in detail with reference to the drawings.

The particulars shown herein are by way of example and for purposes of illustrative discussion of embodiments of the present invention only, and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, and the description is taken with the drawings, making apparent to those skilled in the art how some forms of the present invention may be embodied in practice.

A skin material for vehicle interior 100 of the present invention (see FIG. 1, FIG. 2 showing an A-A cross section in FIG. 1, and FIG. 3 showing an enlarged part in FIG. 2) is bonded to a resinous vehicle interior base 4 (see FIG. 4). The skin material for vehicle interior includes a woven fabric 10 woven by using synthetic resin fibers 1b and 1a, side emission type optical fibers 2, and heat fusible fibers 3 (see FIG. 5 and FIG. 6 showing an a-a cross section in FIG. 5) as warps or wefts. The synthetic resin fibers 1b and 1a and the side emission type optical fibers 2 adjacent to the synthetic resin fibers 1b and 1a are bonded by the fusible fibers 3 in the respective longitudinal directions (see a bonded part 3a in FIGS. 1 to 3).

The woven fabric 10 is woven by using the synthetic resin fibers 1b and 1a, the side emission type optical fibers 2, and the heat fusible fibers 3 as warps or wefts. The heat fusible fibers 3 are woven between the synthetic resin fibers 1b and 1a and the side emission type optical fibers 2 adjacent to the synthetic resin fibers 1b and 1a. Therefore, when the side emission type optical fibers 2 are woven as wefts, the heat fusible fibers 3 are also woven as wefts, and the synthetic resin fibers adjacent to the side emission type optical fibers 2 are also woven as wefts 1b. On the other hand, when the side emission type optical fibers 2 are woven as warps, the heat fusible fibers 3 are also woven as warps, and the synthetic resin fibers adjacent to the side emission type optical fibers 2 are also woven as warps 1a.

Whether the synthetic resin fibers 1b and 1a, the side emission type optical fibers 2, and the heat fusible fibers 3 are woven as warps or wefts is as described above, but a loom used for weaving is not particularly limited. Examples of the loom include a rapier loom (Models "G6500, R9500" manufactured by Itema Weaving Ltd. (Italy)), a jacquard loom (Models "CX880, DX110, LX1602, SXB" manufactured by STAUBLI (France)), and a dobby loom (Model "UVIVAL500" manufactured by STAUBLI (France)).

The synthetic resin fibers 1b and 1a may be multifilaments or monofilaments, but the multifilaments are frequently used. The fineness of the synthetic resin fibers 1b and 1a is also not particularly limited, and may be set in consideration of the easiness of weaving, the physical properties of the woven fabric 10, and the like, in view of the fineness of the side emission type optical fibers 2 and the fineness of the heat fusible fibers, and the like.

The material of the synthetic resin fibers 1b and 1 is not particularly 1 and fibers made of various synthetic resins can be used. Examples of the synthetic resin include polyamide-based resins such as nylon 6 and nylon 66; polyester-based resins such as polyethylene terephthalate, polybutylene terephthalate and polytrimethylene terephthalate; polyacryl-based resins; and polyolefin-based resins such as polypropylene. As the synthetic resins, polyamide-based resins and polyester-based resins are particularly preferred.

The optical fibers are normally composed of a core layer and a clad layer, and have a structure such that the outer periphery of the core layer is covered with the clad layer. Each of the core layer and the clad layer may be a single layer or have a stacked structure of a plurality of layers. Then, depending on the material, refractive index, reflectance, and the like of each of the core layer and the clad layer, side emission type optical fibers 2 can be obtained, which appropriately leak light from the side surface to emit the light. Specific examples include the blending of a scattering substance in the core layer, which causes scattering light to leak from the side surface without causing total reflection in a boundary part between the core layer and the clad layer, and the removal of a part of the clad layer to cause light to leak from the side surface.

Examples of the optical fibers include various optical fibers such as optical fibers made of a resin and quartz-based optical fibers. The optical fibers used in the present invention are woven as warps or wefts of the woven fabric 10 together with the synthetic resin fibers 1b and 1a and the heat fusible fibers 3. Therefore, there are used side emission type optical fibers 2 made of a resin, which are flexible, have excellent bending impact and the like, and can be easily woven.

Furthermore, the diameter of the side emission type optical fibers 2 such as the existing optical fibers made of a resin is from about 0.1 to 10 mm, but from the viewpoint of easiness of weaving, reduction of uneven emission, or versatility, there are used side emission type optical fibers 2 having a diameter of preferably from 0.15 to 1.5 mm, particularly preferably from 0.15 to 1.0 mm, and further particularly preferably from 0.15 to 0.4 mm. The fineness of the side emission type optical fibers 2 made of a resin depends on the types of resins constituting the core layer and the clad layer. For example, as described above, when the diameter is 0.25 mm, the side emission type optical fibers 2 have fineness of about 607 dtex. A preferable fineness range may be set by a preferable fineness ratio of each of the fineness of the synthetic resin fibers 1b and 1b and the fineness of the heat fusible fibers 3 to the fineness of the side emission type optical fibers 2. Additionally, the synthetic resin fibers 1b may have a larger diameter than a diameter of the side emission type optical fibers 2 and a diameter of the heat fusible fibers 3.

As the core layer of the optical fibers made of a resin, there are preferably used resins having excellent transparency: for example, acrylic resins such as polymethyl methacrylate, polyethyl methacrylate and polyethyl acrylate; polycarbonate resins; polystyrene resins; and polyolefin-based resins. Furthermore, as the clad layer, there are preferably used resins having excellent transparency and a refractive index smaller than that of the core layer: for example, vinylidene fluoride resins, vinylidene fluoride-tetrafluoroethylene copolymer resins, polychlorotrifluoroethylene resins and trifluoroisopropyl methacrylate resins.

In order to cause the side emission type optical fibers 2 woven into the skin material for vehicle interior 100 to emit light, the tip parts of the plurality of side emission type optical fibers 2 are bundled, and the light source is disposed at a position facing the end surfaces thereof. The light source is not particularly limited, but an LED is usually used. Light is delivered and guided toward the end surfaces of the side emission type optical fibers 2 bundled from the LED light source, which causes the side emission type optical fibers 2 to emit light. Furthermore, when the tip parts of the plurality of side emission type optical fibers 2 are bundled, all of the side emission type optical fibers 2 woven into the skin material for vehicle interior 100 may be bundled if possible, depending on the shape and size (area) of the skin material for vehicle interior 100. A plurality of side emission type optical fiber bundles in which a predetermined number of the side emission type optical fibers 2 are bundled may be used.

The number of the side emission type optical fibers 2 continuously woven between the adjacent synthetic resin fibers 1b and 1a is not particularly limited, and it can be set to from 1 to 5 from the viewpoints of the design property of the skin material for vehicle interior 100 as an interior material, and the form and strength of the skin material for vehicle interior 100 as a woven fabric 10, and the like. When the synthetic resin fibers 1b and 1a are the multifilaments (see FIG. 1 and the like), the number of the side emission type optical fibers 2 continuously woven can be set to from 2 to 5, and is preferably from 3 to 4.

On the other hand, the synthetic resin fibers 1b and 1a are the monofilaments, which makes it possible to reflect light from the optical fibers utilizing its gloss to ensure sufficient luminance. Therefore, the number of the side emission type optical fibers 2 woven between the synthetic resin fibers 1b and 1a may be 1. Furthermore, the number of the side emission type optical fibers 2 continuously woven can be reduced as compared with the case where the synthetic resin fibers 1b and 1a are the multifilaments, and can be reduced to from 2 to 3. When the synthetic resin fibers 1b and 1a are the monofilaments, the skin material for vehicle interior 100 having an excellent design property and a good appearance can be provided even if the number of the side emission type optical fibers 2 is 2 or 1.

Furthermore, whether the synthetic resin fibers 1b and 1a are the multifilaments or the monofilaments, when the plurality of side emission type optical fibers 2 are woven between the adjacent synthetic resin fibers 1b and 1a, the adjacent side emission type optical fibers 2 are preferably bonded in the respective longitudinal directions thereof by the heat fusible fibers 3. Thus, if the adjacent synthetic resin fibers 1b and 1a are bonded to the side emission type optical fibers 2, and further the adjacent side emission type optical fibers 2 are bonded, the fray of the side emission type optical fibers 2 when the skin material for vehicle interior 100 is cut can be more efficiently suppressed.

With regard to the heat fusible fibers 3, at least a part of the heat fusible fibers 3 is only needed to melt at a predetermined temperature to bond the synthetic resin fibers 1b and 1a, the side emission type optical fibers 2 adjacent thereto, and the side emission type optical fibers 2 when the side emission type optical fibers 2 are woven adjacent to each other in the respective longitudinal directions, and the material and the like thereof is not particularly limited. A temperature at which at least a part of the heat fusible fibers 3 melts is also not particularly limited. However, as long as the heat fusible fibers 3 melt in any of the steps of manufacturing the skin material for vehicle interior 100, and the synthetic resin fibers 1b and 1a, the adjacent side emission type optical fibers 2, and the adjacent side emission type optical fibers 2 can be bonded, it is unnecessary to separately provide a step for heat fusion, which is preferable.

As described above, the material and melting temperature of the heat fusible fibers 3 are not particularly limited. However, in order to melt in the step of using the woven fabric 10 as the skin material for vehicle interior 100 and act as the heat fusible fibers 3, the heat fusible fibers 3 preferably melt at a relatively low temperature, for example from 70 to 100° C., and particularly from 70 to 90° C. Examples of the heat fusible fibers 3 include amorphous copolymerized polyester fibers, polyamide fibers, and polyacrylic fibers.

Furthermore, the heat fusible fibers 3 are not usually used only as heat fusion yarns 31, but used as composite fibers obtained by twisting multifilaments 32 made of synthetic resin fibers which do not melt when the heat fusion yarns 31 melt, and the heat fusion yarns 31 (see FIG. 7). As the multifilaments 32, multifilaments made of the same material as that of the synthetic resin fibers 1b and 1a and having small fineness can be used. Such composite fibers make it possible to provide a sufficient strength and the like and easily weave the composite fibers when the woven fabric 10 is woven. Furthermore, even after melting and bonding, the multifilaments 32 remain as constituent yarns of the skin material for vehicle interior 100 as they are, whereby the reduction in the strength and the like of the skin material for vehicle interior 100 is suppressed.

The vehicle interior base 4 (see FIG. 4) is usually a molded body made of a synthetic resin, and is molded into the shape of a vehicle interior material such as a door trim or a roof trim by a press-molding method in which heating and pressing are performed using a mold. The synthetic resin is not particularly limited, and polyolefin-based resins such as polyethylene and polypropylene, and polyamide-based resins such as nylon 6 and nylon 66 are used. Among these synthetic resins, polypropylene is preferable from the viewpoints of easiness to mold, strength, and the like. A fiber reinforced resin including glass fibers, carbon fibers, or the like can be used in order to improve physical properties such as rigidity.

It should be noted that the foregoing examples have been provided merely for the purpose of explanation and are not to be construed as limiting of the present invention. While the present invention has been described with reference to exemplary embodiments, it is understood that the words which have been used herein are words of description and illustration, rather than words of limitation. Changes may be made, within the scope of the appended claims, as described in detail herein, without departing from the scope and spirit of the present invention in its aspects. Although reference has been made herein to specific structures, materials and embodiments in the detailed description of the invention, the present invention is not intended to be limited to the particulars disclosed herein. Rather, the present invention extends to all functionally equivalent structures, methods and uses within the scope of the appended claims.

The present invention can be utilized in the technical field of a skin material for vehicle interior which is bonded to a vehicle interior base and functions as indirect vehicle interior lighting. In particular, the present invention is useful in the technical field of a skin material for vehicle interior such as a door trim or a roof trim.

What is claimed is:

1. A skin material for vehicle interior bonded to a resinous vehicle interior base, the skin material for vehicle interior comprising a woven fabric woven by using synthetic resin fibers, side emission type optical fibers, and heat fusible fibers as warps or wefts,
   wherein the synthetic resin fibers and the side emission type optical fibers adjacent to the synthetic resin fibers are bonded in respective longitudinal directions by the heat fusible fibers, and
   wherein the synthetic resin fibers have a larger diameter than a diameter of the side emission type optical fibers and a diameter of the heat fusible fibers.

2. The skin material for vehicle interior according to claim 1, wherein:
   a plurality of the side emission type optical fibers are woven between the synthetic resin fibers adjacent to each other; and
   the side emission type optical fibers adjacent to each other are bonded to each other in the longitudinal direction by the heat fusible fibers.

3. The skin material for vehicle interior according to claim 1, wherein the heat fusible fibers comprise multifilament fibers and heat fusion fibers twisted together, the heat fusion fibers having a melting point lower than that of the multifilament fibers.

4. The skin material for vehicle interior according to claim 2, wherein the heat fusible fibers comprise multifilament fibers and heat fusion fibers twisted together, the heat fusion fibers having a melting point lower than that of the multifilament fibers.

5. The skin material for vehicle interior according to claim 3, wherein the multifilament fibers remain as constituent yarns after the bonding.

6. The skin material for vehicle interior according to claim 4, wherein the multifilament fibers remain as constituent yarns after the bonding.

\* \* \* \* \*